United States Patent
Yang

(10) Patent No.: US 12,515,858 B2
(45) Date of Patent: Jan. 6, 2026

(54) SEALED CAN

(71) Applicant: Chun-Sheng Yang, Tainan (TW)

(72) Inventor: Chun-Sheng Yang, Tainan (TW)

(*) Notice: Subject to any disclaimer, the term of this patent is extended or adjusted under 35 U.S.C. 154(b) by 0 days.

(21) Appl. No.: 18/660,254

(22) Filed: May 10, 2024

(65) Prior Publication Data

US 2025/0346415 A1  Nov. 13, 2025

(51) Int. Cl.
*B65D 53/04* (2006.01)
*B65D 43/02* (2006.01)

(52) U.S. Cl.
CPC ........... *B65D 53/04* (2013.01); *B65D 43/021* (2013.01); *B65D 2543/00518* (2013.01); *B65D 2543/00981* (2013.01)

(58) Field of Classification Search
CPC ...... B65D 2255/06; B65D 2543/00037; B65D 2543/00435; B65D 51/02; B65D 53/04; B65D 43/021; B65D 2543/005; B65D 2543/00981; A47J 31/4407
See application file for complete search history.

(56) References Cited

U.S. PATENT DOCUMENTS

| | | | | |
|---|---|---|---|---|
| 4,303,171 A * | 12/1981 | Schremmer | ............ | B65D 39/12 |
| | | | | 220/281 |
| 7,204,383 B2 * | 4/2007 | Hsu | ............ | B65D 39/12 |
| | | | | 220/803 |
| 2005/0205577 A1 * | 9/2005 | Park | ............ | A47J 27/56 |
| | | | | 220/756 |
| 2006/0151511 A1 * | 7/2006 | Kaposi | ............ | B65D 43/022 |
| | | | | 220/573.1 |
| 2007/0050901 A1 * | 3/2007 | Hung | ............ | A47K 1/14 |
| | | | | 4/295 |
| 2021/0177196 A1 * | 6/2021 | Upston | ............ | A47J 36/10 |
| 2021/0269200 A1 * | 9/2021 | Ou | ............ | B65D 51/242 |
| 2024/0017890 A1 * | 1/2024 | Li | ............ | B65D 43/022 |
| 2024/0349930 A1 * | 10/2024 | Weber | ............ | A47J 31/085 |
| 2025/0009163 A1 * | 1/2025 | Weber | ............ | A47J 31/446 |
| 2025/0151943 A1 * | 5/2025 | Bullock | ............ | A47J 31/20 |

* cited by examiner

*Primary Examiner* — Shawn M Braden

(57) ABSTRACT

The present invention provides a sealed can, which includes a container, a lid, a sealing member, a fixing member and a handle respectively arranged thereon. The lid is closed on the container. The sealing member is located at a bottom of the lid. The fixing member is located on the bottom surface of the sealing member. The fixing member includes an embedded hole arranged in the middle part thereof and an inlay protruding therein. The handle is located above the lid. The handle includes a protruding column arranged at the bottom thereof, a protruding body at the bottom of the protruding column, and an embedded groove arranged on the wall of the protruding body. The inlay of the fixing member and the embedded groove of the handle are snap-fitted with each other. In this way, the lid can be easily removed from the container by pulling the handle.

1 Claim, 5 Drawing Sheets

SEALED CAN

BACKGROUND OF THE PRESENT INVENTION

Field of Invention

The present invention relates to a sealed can that is easy to seal and unseal.

Description of Related Arts

Conventional sealed cans are used to isolate the space inside the container from the outside air, to prevent food from becoming damp. Generally, a sealed can is composed of a container and a lid that is sealed on the container. A sealing ring with airtightness is usually set on the lid, which tightly fits on the inner wall of the container to achieve airtightness. However, in conventional sealed cans, the sealing ring on the lid is forced into the container and fits tightly to achieve the sealing effect. Due to the pressure difference between the inside and outside of the container, when opening the lid, it is usually necessary to exert greater force to remove the lid from the container. When opening the lid, the user often hits the user's chin or body due to improper force application, and it is also common for the container to be overturned due to unstable grip while exerting force to open the lid, causing the content to spill. Therefore, it is inconvenient to use, and forcing the lid to detach from the container multiple times will accelerate the aging of the sealing ring and affect its airtightness.

SUMMARY OF THE PRESENT INVENTION

The main purpose of the present invention is to provide a sealed can that can effectively solve the shortcomings of conventional sealed cans during use.

The sealed can of the present invention includes a container, a lid, a sealing member, a fixing member and a handle respectively arranged thereon, wherein the lid is closed on the container, wherein the lid includes a perforation arranged in the middle part thereof, a positioning blocking edge arranged on the top thereof, and a flange surrounding on the bottom thereof, wherein the sealing member is located at a bottom of the lid, and the sealing member is made of soft material with sealing effect, wherein the sealing member includes a through hole arranged in the middle part thereof and a sealing portion arranged on the outer periphery thereof, wherein the fixing member is located on the bottom surface of the sealing member, wherein the fixing member includes an embedded hole arranged in the middle part thereof and an inlay protruding therein, wherein the handle is located above the lid, wherein the handle includes a protruding column arranged at the bottom thereof, a protruding body at the bottom of the protruding column, and an embedded groove arranged on the wall of the protruding body, wherein the inlay of the fixing member and the embedded groove of the handle are snap-fitted with each other.

The advantage of the sealed can of the present invention is that the sealed can is capable of being sealed for use by covering the lid, and the sealing member is capable of being moved away from the inner wall of the container by pulling the tab on the lid, so that the sealed can is capable of being unsealed and the lid of the sealed can is capable of being easily opened without exerting force.

DETAILED DESCRIPTION OF THE PREFERRED EMBODIMENT

Figure 1:
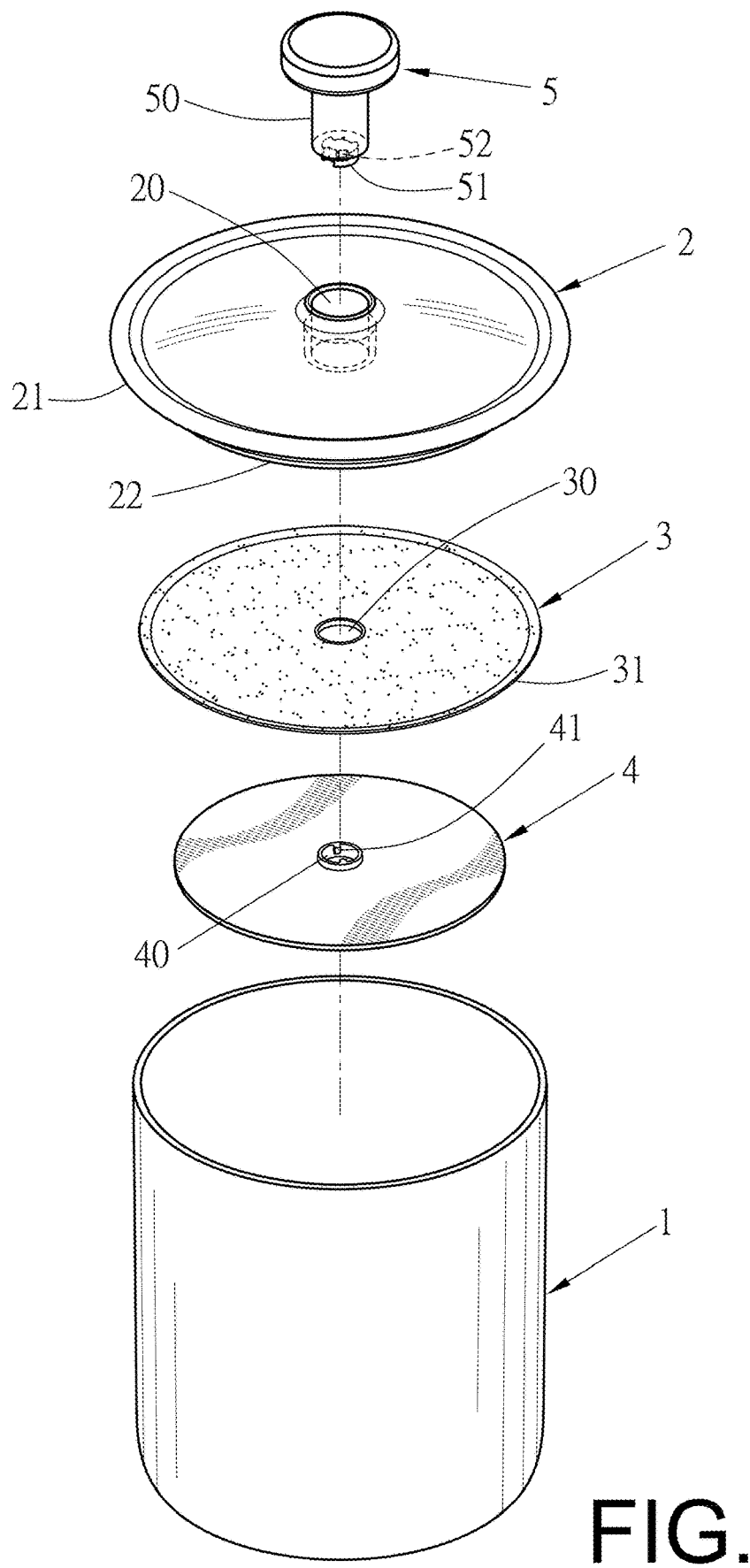
FIG. 1 illustrates an exploded view of a preferred embodiment of the present invention.
Figure 2:
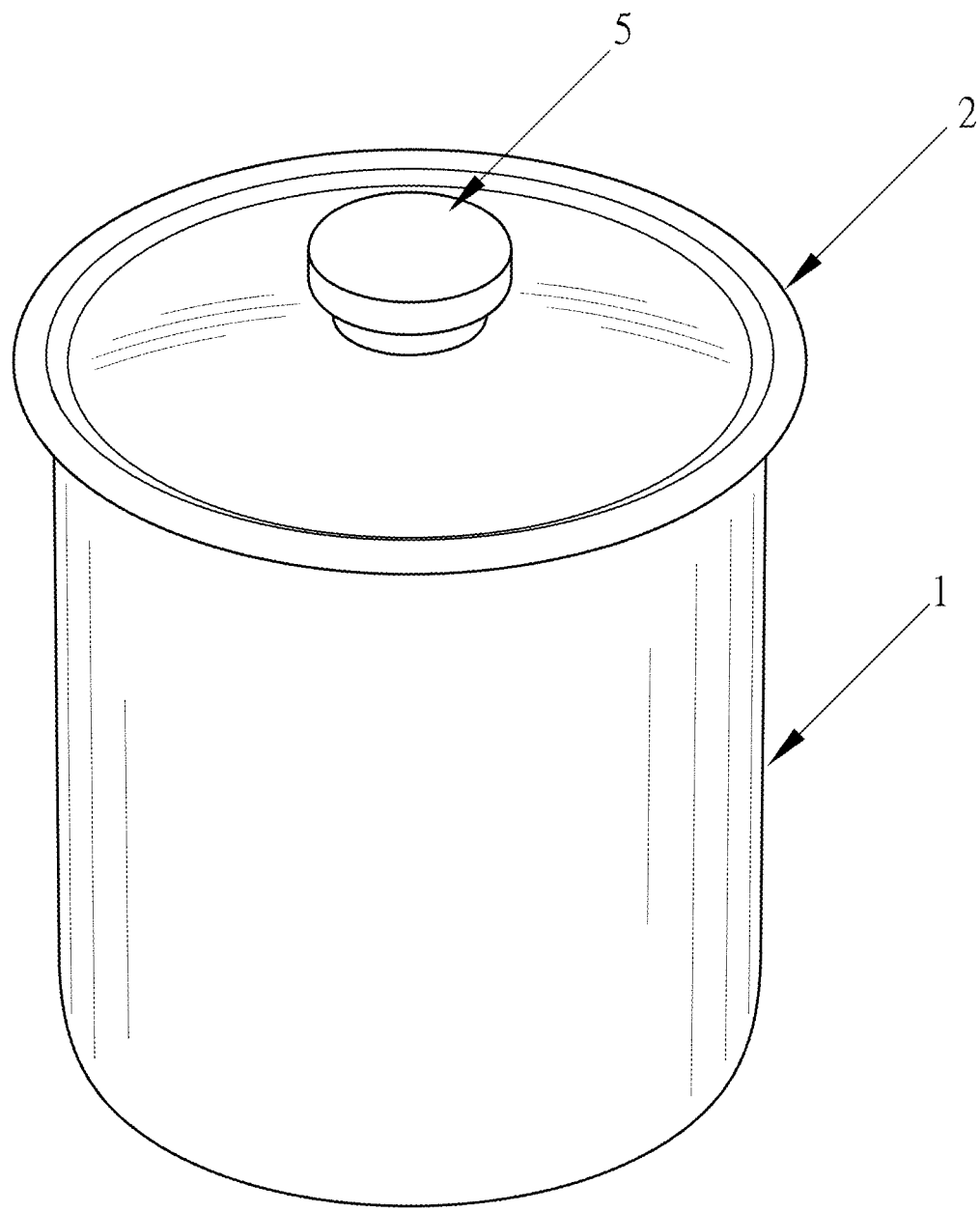
FIG. 2 illustrates an assembled perspective view of the preferred embodiment of the present invention.
Figure 3:
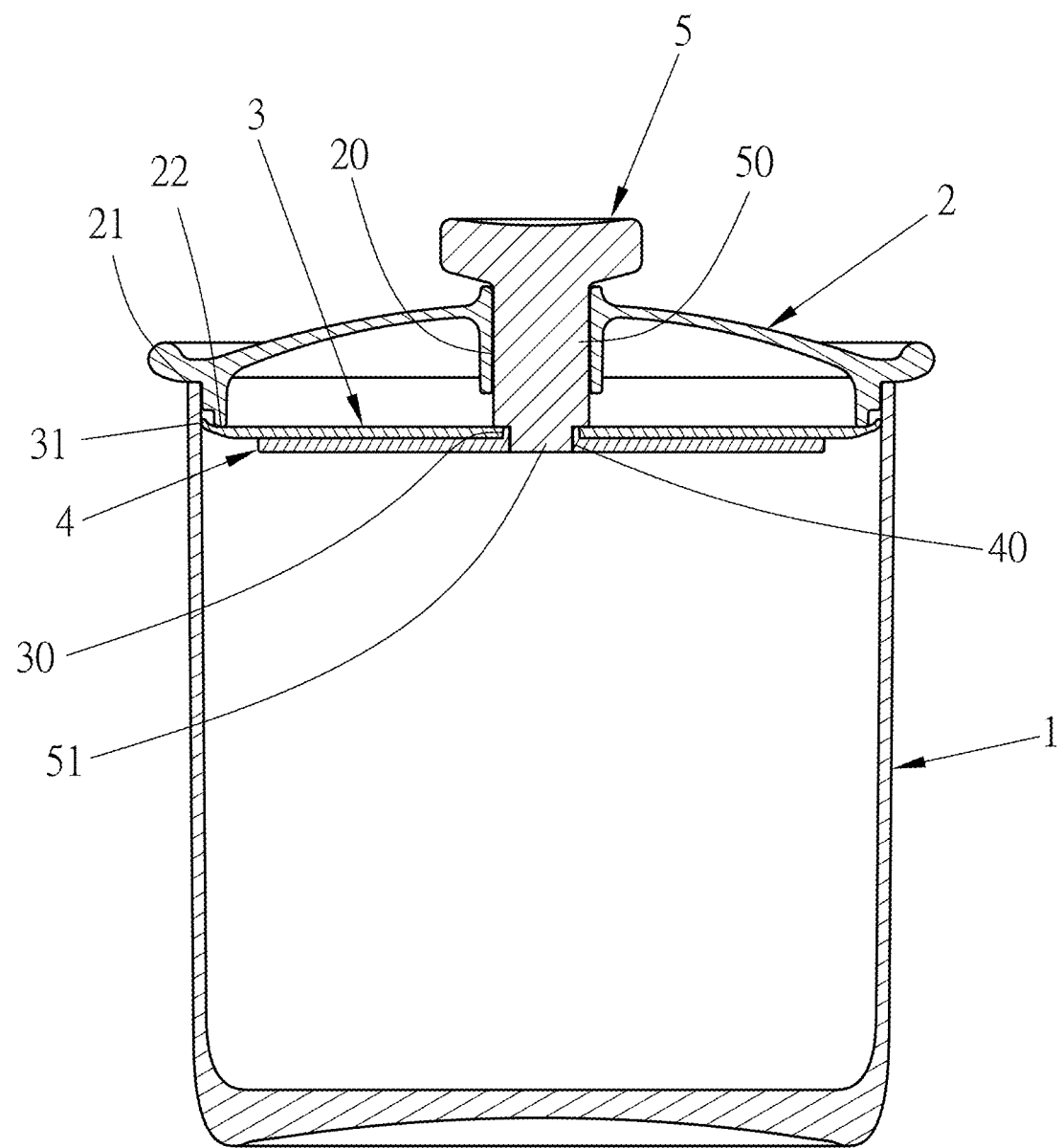
FIG. 3 illustrates an assembled sectional view of the preferred embodiment of the present invention.
Figure 4:
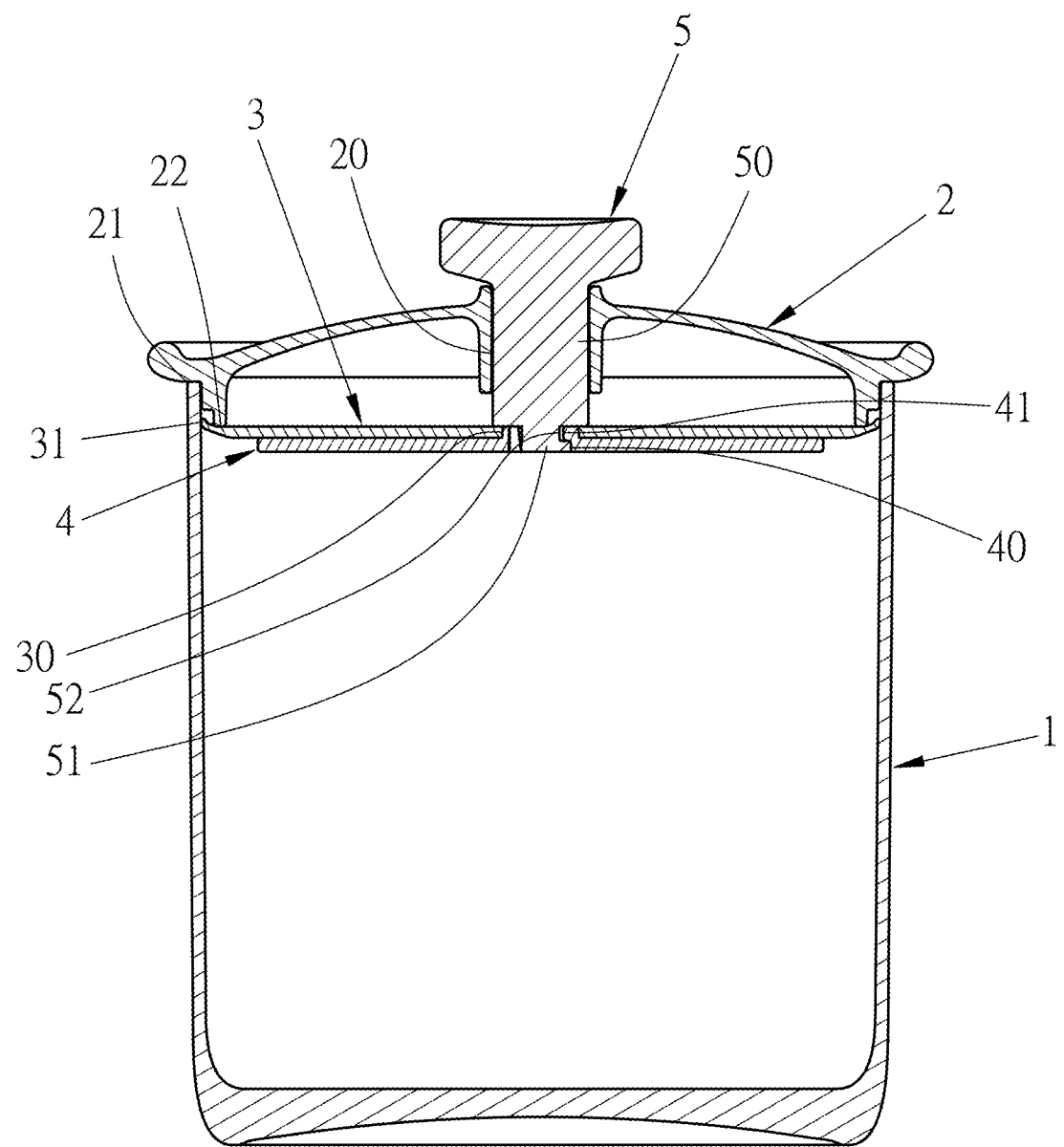
FIG. 4 illustrates an assembled sectional view from another angle of the preferred embodiment of the present invention.
Figure 5:
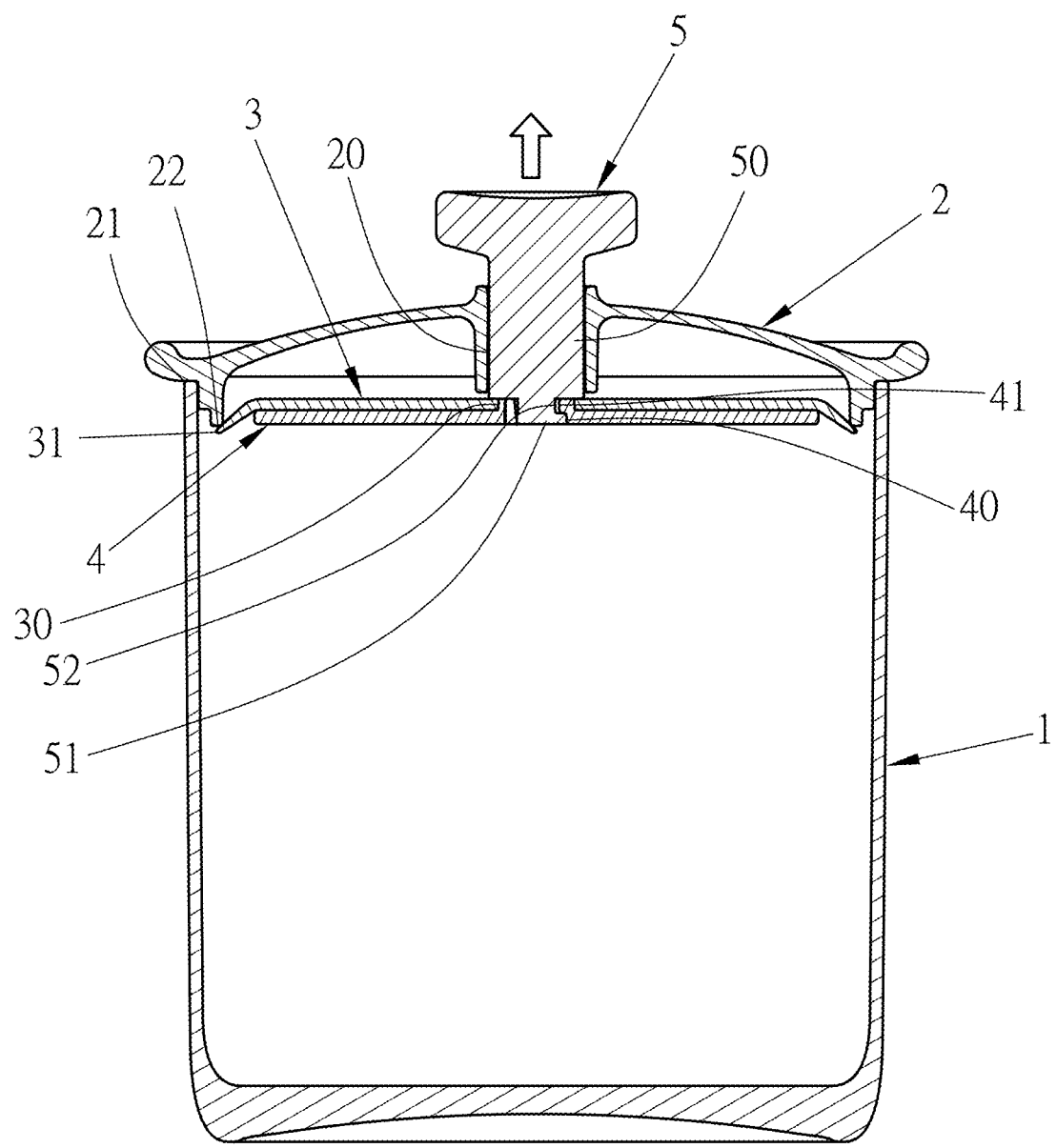
FIG. 5 illustrates a sectional view of the preferred embodiment of the present invention when the handle is pulled upward to unseal.

Regarding the technical means adopted by the present invention to achieve the above-mentioned purposes and effects, the best and feasible embodiments are enumerated and shown in the drawings, and are described in detail as follows:

Referring to the embodiment of the present invention, as shown in FIG. 1, the sealed can includes a container 1, a lid 2, a sealing member 3, a fixing member 4 and a handle 5 respectively arranged thereon, wherein the lid 2 is closed on the container 1, wherein the lid 2 includes a perforation 20 arranged in the middle part thereof, a positioning blocking edge 21 arranged on the top thereof, and a flange 22 surrounding on the bottom thereof, wherein the scaling member 3 is located at a bottom of the lid 2, and the sealing member 3 is made of soft material with sealing effect, wherein the sealing member 3 includes a through hole 30 arranged in the middle part thereof and a sealing portion 31 arranged on the outer periphery thereof, wherein the fixing member 4 is located on the bottom surface of the sealing member 3, wherein the fixing member 4 includes an embedded hole 40 arranged in the middle part thereof and an inlay 41 protruding therein, wherein the handle 5 is located above the lid 2, wherein the handle 5 includes a protruding column 50 arranged at the bottom thereof, a protruding body 51 at the bottom of the protruding column 50, and an embedded groove 52 arranged on the wall of the protruding body 51, wherein the inlay 41 of the fixing member 4 and the embedded groove 52 of the handle 5 are snap-fitted with each other, thus forming a sealed can structure.

When assembling the embodiment of the present invention, referring to FIGS. 1 to 4, place the fixing member 4 attached the bottom surface of the sealing member 3, and place the sealing member 3 and the fixing member 4 together on the bottom of the lid 2, then insert the protruding column 50 of the handle 5 into the perforation 20 of the lid 2 and the through hole 30 of the sealing member 3, and set the protruding body 51 of the handle 5 into the embedded hole 40 of the fixing member 4, and rotate the handle 5 so that the inlay 41 of the fixing member 4 is embedded in the embedded groove 52 on the protruding body 51 of the handle 5, and the flange 22 at the bottom of the lid 2 resists the scaling member 3. Then, cover the lid 2 on the container 1, the sealing portion 31 on the outer periphery of the sealing member 3 is closely attached to the inner wall of the container 1, while the positioning blocking edge 21 of the lid 2 is attached to the top surface of the container 1. In this way, the overall assembly can be completed.

When the present invention is used, referring to FIGS. 2 to 5, place the food to be stored in the container 1, and then directly cover the lid 2 on the container 1, and the sealing portion 31 of the sealing member 3 under the lid 2 is tightly attached to the inner wall of the container 1 to form a sealing state, which can prevent external air from entering the container 1, and the food in the container 1 can be sealed and stored. When the food in container 1 is to be taken up, only the handle 5 located above the lid 2 needs to be pulled upward, the handle 5 drives the fixing member 4 and the sealing member 3 to move upward, the sealing member 3 moves upwards so that the sealing portion 31 of the outer peripheral edge thereof is separated from the inner wall of the container 1, the sealing portion 31 of the sealing member 3 is no longer attached to the inner wall of the container 1 and forms an unsealing state, the user can easily open the lid 2 without exerting force, and the lid 2 is removed from the container 1, and the sealed can of the present invention is extremely convenient and fast in the operation of sealing and unsealing.

In summary, the present invention has indeed achieved the anticipated objectives and effects and is more ideal and practical than the prior art. However, the above-mentioned embodiments are only specific explanations for the preferred embodiments of the present invention, and this embodiment is not intended to limit the scope of the present invention. All equivalent variations and modifications completed under the technical means disclosed in the present invention should be included in the scope of patent protection of the present invention.

What is claimed is:

1. A sealed can, comprising a container, a lid, a sealing member, a fixing member and a handle respectively arranged thereon, wherein the lid is closed on the container, wherein the lid comprises a perforation arranged in a middle part thereof, a positioning blocking edge arranged on a top thereof, and a flange surrounding on a bottom thereof, wherein the sealing member is located at a bottom of the lid, and the sealing member is made of soft material with sealing effect, wherein the sealing member comprises a through hole arranged in the middle part thereof and a sealing portion arranged on the outer periphery thereof, wherein the fixing member is located on the bottom surface of the sealing member, wherein the fixing member comprises an embedded hole arranged in the middle part thereof and an inlay protruding therein, wherein the handle is located above the lid, wherein the handle comprises a protruding column arranged at the bottom thereof, a protruding body at the bottom of the protruding column, and an embedded groove arranged on the wall of the protruding body, wherein the inlay of the fixing member and the embedded groove of the handle are snap-fitted with each other, when the lid is covered directly on the container and the sealing portion of the sealing member under the lid is tightly attached to an inner wall of the container to form a sealing state, when the handle is pulled upwards to drive the fixing member and the sealing member to move upwards, the sealing portion of the sealing member is detached from the inner wall of the container to form an unsealing state.

* * * * *